J. S. HARRIS.
RIM AND TIRE FOR WHEELS.
APPLICATION FILED APR. 19, 1915.
1,226,880.
Patented May 22, 1917.
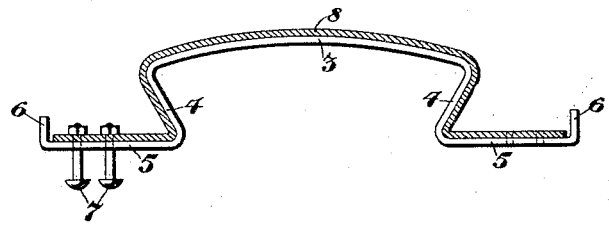
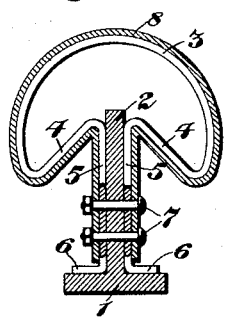 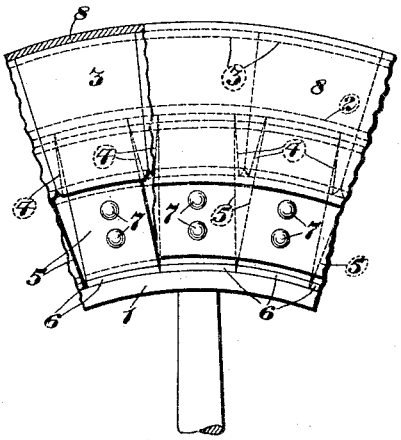
Attest.
Charles A. Becker
Inventor:
John S. Harris,
by Rippey & Kingsland,
His Attorneys.

UNITED STATES PATENT OFFICE.

JOHN S. HARRIS, OF ST. LOUIS, MISSOURI.

RIM AND TIRE FOR WHEELS.

1,226,880.   Specification of Letters Patent.   Patented May 22, 1917.

Application filed April 19, 1915. Serial No. 22,393.

*To all whom it may concern:*

Be it known that I, JOHN S. HARRIS, a citizen of the United States, residing in the city of St. Louis and State of Missouri, have invented a new and useful Rim and Tire for Wheels, of which the following is a specification.

This invention relates to rims and tires for wheels, and it has particular reference to that class of rims and tires in which there is a resilient tire mounted on a rim, and in which the necessity of the pneumatic devices ordinarily employed is obviated.

A broad object of the invention is to provide an improved rim and tire comprising a series of resilient tire elements independently attached to the rim, and each composed of a section of resilient metal shaped to provide a curved portion adapted to coöperate with similar portions on the other sections to form the complete tire, and having extended portions attached to opposite sides of the rim.

Another object is to provide a tire of the character mentioned, in combination with a rim provided with a radial flange adapted to serve as a connection for sections composing the tire, thus producing both a novel rim and a novel tire organized into a novel coöperating combination of elements.

Other objects and advantages will appear from the following description, reference being made to the accompanying drawing in which—

Figure 1 is an edge of one of the metallic tire sections in open or extended position before being attached to the rim.

Fig. 2 is a transverse sectional view of the rim and tire illustrating the attachment of the tire members to the rim.

Fig. 3 is a side elevation of a part of a rim and tire, a portion of the casing being removed to illustrate the arrangement of the tire members which are side by side.

The rim includes an annular portion 1 adapted to be secured to the outer ends of the spokes of the wheel, as usual. The rim is provided with a centrally disposed circumferential flange 2 which constitutes the support to which the tire members are secured, and which coöperates directly with the tire members in supporting the weight of the vehicle.

The tire of the wheel is composed of a plurality of metallic sections placed edge to edge in a circumferential series, and folded to form semi-circular tire portions 3, the opposite sides of which are provided with substantially radial inwardly extending portions 4, the latter being folded to form securing portions 5. The extremities of the securing portions 5 are extended laterally in the form of flanges 6 which are adapted to abut against the periphery of the rim 1, the securing portions 5 bearing against opposite sides of the flange 2 and being secured in position by releasable bolts 7.

In one embodiment the tire may be constructed by securing the different sections thereof to the rim so that said sections are disposed edge to edge, thus forming a complete annular series and completing the tire. The entire series of tire elements are incased within a cover 8 composed of any suitable material, and secured in position in any convenient manner, whether by adhesion or otherwise. It is obvious that the tire thus constructed possesses the necessary resiliency, and will yield both to perpendicular and lateral stresses without injury. It is further apparent that the different sections reinforce and strengthen each other, and that the stresses are distributed to several of the adjacent sections. No pneumatic devices are employed, and such devices are entirely unnecessary in a wheel embodying the metallic sectional tire and rim. As shown in Fig. 2 the flange portion 2 of the rim extends beyond the angles of the parts 4—5, so that when the tire is compressed by severe percussive force the outer portions 3 of the tire members will be pressed against the periphery of the flange 2, thus positively preventing excessive strain from being imparted to any of the tire members.

I am aware that there may be various alterations and modifications in the construction and arrangements of the parts comprising the invention, and that there may be other embodiments than those above specifically mentioned without departure from the spirit and scope of the invention. Therefore, I do not restrict myself to identical features of construction or arrangement, but what I claim and desire to secure by Letters Patent of the United States is:

1. A combined tire and rim, comprising a rim including an annular portion and a circumferential flange, in combination with a tire comprising a series of resilient elements independently attached to said flange and each composed of a section of resilient material formed to provide a semi-circular portion coöperating with similar portions on the other sections to form the complete tire, radial extensions integral with each semi-circular portion, parallel extended portions integral with said radial extensions attached to opposite sides of said flange, and a cover for said series of elements.

2. A combined tire and rim, comprising a rim including an annular portion and a circumferential flange, in combination with a tire comprising a series of resilient elements each composed of a section of resilient material including a semi-circular portion coöperating with similar portions on the other sections to form the complete tire, converging radial extensions integral with each semi-circular portion, parallel extended portions integral with said radial extensions and bearing against opposite sides of said flange, devices passing through said extended portions and through said flange and binding said parts together, and a cover for said series of elements.

3. A combined tire and rim, comprising a rim including an annular portion and a circumferential flange, in combination with a tire comprising a series of resilient elements each composed of a section of resilient material including a semi-circular portion coöperating with similar portions on the other sections to form the complete tire, converging radial extensions integral with each semi-circular portion, parallel extended portions integral with said radial extensions lying on opposite sides of said flange, elements passing through said extended portions and through said flange and binding said parts together, lateral extensions on said extended portions bearing against the annular portion of the rim, and a cover for said series of elements.

In witness whereof, I have signed this specification in the presence of two subscribing witnesses.

JOHN S. HARRIS.

Witnesses:
R. M. LAWRENCE,
JOHN D. RIPPEY.

Copies of this patent may be obtained for five cents each, by addressing the "Commissioner of Patents, Washington, D. C."